(12) United States Patent
Sakashita et al.

(10) Patent No.: US 8,803,043 B2
(45) Date of Patent: Aug. 12, 2014

(54) HONEYCOMB STRUCTURE

(71) Applicant: NGK Insulators, Ltd., Nagoya (JP)

(72) Inventors: Satoshi Sakashita, Nagoya (JP); Yoshimasa Omiya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/628,521

(22) Filed: Sep. 27, 2012

(65) Prior Publication Data

US 2013/0043236 A1 Feb. 21, 2013

Related U.S. Application Data

(63) Continuation of application No. PCT/JP2011/058173, filed on Mar. 31, 2011.

(30) Foreign Application Priority Data

| Mar. 31, 2010 | (JP) | 2010-080370 |
| Aug. 12, 2010 | (JP) | 2010-180893 |
| Dec. 10, 2010 | (JP) | 2010-276038 |

(51) Int. Cl.
| *H05B 3/10* | (2006.01) |
| *F01N 3/20* | (2006.01) |
| *F01N 3/28* | (2006.01) |
| *B01J 35/04* | (2006.01) |
| *B01D 53/32* | (2006.01) |
| *B01D 53/94* | (2006.01) |

(52) U.S. Cl.
CPC ............ *F01N 3/2828* (2013.01); *F01N 3/2026* (2013.01); *F01N 2330/30* (2013.01); *F01N 2330/06* (2013.01); *Y02T 10/26* (2013.01); *B01D 53/32* (2013.01); *F01N 2240/16* (2013.01); *B01J 35/04* (2013.01); *B01D 53/94* (2013.01); *F01N 2260/08* (2013.01)

USPC ........................................ 219/553

(58) Field of Classification Search
USPC ............ 219/553, 541; 338/306–314; 428/116
See application file for complete search history.

(56) References Cited

U.S. PATENT DOCUMENTS

| 5,063,029 A | 11/1991 | Mizuno et al. |
| 5,266,278 A * | 11/1993 | Harada et al. ................. 422/174 |

(Continued)

FOREIGN PATENT DOCUMENTS

| EP | 2 540 382 A1 | 1/2013 |
| EP | 2 656 901 A1 | 10/2013 |

(Continued)

OTHER PUBLICATIONS

U.S. Appl. No. 13/591,494, filed Aug. 22, 2012, Noguchi et al.

(Continued)

*Primary Examiner* — Dana Ross
*Assistant Examiner* — Renee L Miller
(74) *Attorney, Agent, or Firm* — Burr & Brown, PLLC

(57) ABSTRACT

A honeycomb structure is provided with a pair of electrode sections disposed on the side face of the honeycomb structure section. The honeycomb structure section has an electrical resistivity of 1 to 200 Ωcm, and each of the pair of electrode sections is formed into a band-like shape extending in a cell extension direction of the honeycomb structure section. In a cross section perpendicular to the cell extension direction, one electrode section of the pair of electrode sections is disposed across the center O of the honeycomb structure section from the other electrode section of the pair of electrode sections. In a cross section perpendicular to the cell extension direction, 0.5 times the central angle of each of the electrode sections is 15 to 65°.

16 Claims, 6 Drawing Sheets

(56) References Cited

U.S. PATENT DOCUMENTS

| | | | |
|---|---|---|---|
| 5,288,975 | A | 2/1994 | Kondo |
| 2003/0134084 | A1 | 7/2003 | Ichikawa et al. |
| 2012/0076698 | A1 | 3/2012 | Ishihara |
| 2012/0076699 | A1 | 3/2012 | Ishihara |
| 2012/0183725 | A1 | 7/2012 | Noguchi et al. |
| 2012/0187109 | A1 | 7/2012 | Noguchi et al. |
| 2013/0043237 | A1 | 2/2013 | Sakashita et al. |
| 2013/0045137 | A1 | 2/2013 | Sakashita et al. |

FOREIGN PATENT DOCUMENTS

| | | |
|---|---|---|
| JP | 07-185264 A1 | 7/1995 |
| JP | 2931362 B2 | 8/1999 |
| JP | 11-253814 A1 | 9/1999 |
| JP | 4136319 B2 | 8/2008 |
| JP | 2012-092820 | 5/2012 |
| JP | 2012-092821 | 5/2012 |
| WO | 2011/125816 A1 | 10/2011 |
| WO | 2011/125817 A1 | 10/2011 |

OTHER PUBLICATIONS

U.S. Appl. No. 13/628,672, filed Sep. 27, 2012, Sakashita et al.
U.S. Appl. No. 13/628,740, filed Sep. 27, 2012, Sakashita et al.
International Search Report and Written Opinion dated May 10, 2011.
U.S. Appl. No. 13/923,664, filed Jun. 21, 2013, Kasai et al.
U.S. Appl. No. 13/923,931, filed Jun. 21, 2013, Kasai et al.
U.S. Appl. No. 13/922,809, filed Jun. 20, 2013, Kasai et al.
U.S. Appl. No. 13/922,809, filed Jun. 20, 2013, Noro et al.
U.S. Appl. No. 14/018,710, filed Sep. 5, 2013, Hosoi et al.
U.S. Appl. No. 14/027,557, filed Sep. 16, 2013, Kasai et al.
European Search Report mailed Jun. 4, 2014 (EP Application No. 11765715.5).

* cited by examiner

HONEYCOMB STRUCTURE

BACKGROUND OF THE INVENTION

1. Technical Field

The present invention relates to a honeycomb structure and, more specifically, relates to a honeycomb structure which functions not only as a catalyst carrier, but also as a heater by applying a voltage and which can suppress bias of a temperature distribution when the voltage is applied.

2. Description of Related Art

Conventionally, a cordierite honeycomb structure having a catalyst loaded thereon has been used for treating harmful substances in exhaust gas discharged from an automobile engine. It is known that a honeycomb structure formed of a silicon carbide based sintered body is used for purifying exhaust gas (see, e.g., Patent Document 1).

In the case of treating exhaust gas by a catalyst loaded on a honeycomb structure, it is necessary to raise temperature of the catalyst up to predetermined temperature. However, since catalyst temperature is low upon engine start-up, there was a problem of insufficient purification of exhaust gas.

Therefore, there is studied a method for raising temperature of exhaust gas by disposing a metal heater on the upstream side of a honeycomb structure having a catalyst loaded thereon (see, e.g., Patent Document 2).

PRIOR ART DOCUMENT

Patent Document

Patent Document 1: JP-4136319-B
Patent Document 2: JP-2931362-B

SUMMARY OF THE INVENTION

In the case of installing a heater as described above in an automobile and using it, a power source used for an electrical system of the automobile is used commonly, and a power source having a high voltage of, for example, 200V is used. However, since a metal heater has a low electrical resistance, when a power source having such a high voltage was used, there was a problem of damaging the power source circuit because a current flows extremely.

In addition, when the heater was made of metal, it was difficult to unitarily join a catalyst to the heater because it was hard to load a catalyst even if the heater was processed to have a honeycomb structure.

The present invention has been made in view of the aforementioned problems and aims to provide a honeycomb structure which functions not only as a catalyst carrier, but also as a heater by applying a voltage and which can suppress bias of a temperature distribution when the voltage is applied.

In order to solve the aforementioned problems, the present invention provides the following honeycomb structure.

[1] A honeycomb structure provided with a cylindrical honeycomb structure section having porous partition walls separating and forming a plurality of cells extending from one end face to the other end face and functioning as fluid passages and an outer peripheral wall located in the outermost periphery and a pair of electrode sections disposed on the side face of the honeycomb structure section, wherein the honeycomb structure section has an electrical resistivity of 1 to 200 Ωcm, each of the pair of electrode sections is formed into a band-like shape extending in a cell extension direction of the honeycomb structure section, in a cross section perpendicular to the cell extension direction, one electrode section of the pair of electrode sections is disposed across the center of the honeycomb structure section from the other electrode section of the pair of electrode sections, and, in a cross section perpendicular to the cell extension direction, 0.5 times the central angle of each of the electrode sections is 15 to 65°.

[2] A honeycomb structure according to [1], wherein the electrical resistivity of the electrode section is 0.1 to 100 Ωcm.

[3] A honeycomb structure according to [1] or [2], wherein the thickness of the electrode section is 0.01 to 5 mm.

[4] A honeycomb structure according to any one of Claims [1] to [3], wherein an electrode terminal protruding portion for connecting an electrical wiring is disposed in a center portion in a cross section perpendicular to the cell extension direction and center portion in the cell extension direction of each of the electrode sections.

[5] A honeycomb structure according to any one of Claims [1] to [4], wherein the electrode section has a plurality of regions arranged along the outer periphery of the honeycomb structure section in a cross section perpendicular to the cell extension direction and wherein the electrode section is thickest in a region located at the center, thinner in a region closer to the outside, and thinnest in a region located at both ends in a cross section perpendicular to the cell extension direction.

In a honeycomb structure of the present invention, since the honeycomb structure section has an electrical resistivity of 1 to 200 Ωcm, even if an electric current is sent by the use of a power source having a high voltage, the current does not flow excessively, and it can suitably be used as a heater. In addition, since "each of the pair of electrode sections is formed into a band-like shape extending in a cell extension direction of the honeycomb structure section; in a cross section perpendicular to the cell extension direction, one of the pair of electrode sections is disposed across the center of the honeycomb structure section from the other electrode section of the pair of electrode sections; and, in a cross section perpendicular to the cell extension direction, 0.5 times the central angle of each of the electrode sections is 15 to 65°"; bias of a temperature distribution at the time of applying a voltage can be suppressed. In particular, in a cross section perpendicular to the cell extension direction, since 0.5 times the central angle of each of the electrode sections is 15 to 65°, bias of a current flowing through the honeycomb structure section can be suppressed when a voltage is applied between the pair of electrode sections, and thereby suppressing bias of heat generation in the honeycomb structure section.

DESCRIPTION OF THE INVENTION

Next, embodiments for carrying out the invention will be described in detail with referring to drawings. However, the present invention is by no means limited to the following embodiments, and it should be understood that changes, improvements, and the like of the design can suitably be made on the basis of ordinary knowledge of a person of ordinary skill in the art within the range of not deviating from the gist of the present invention.

Figure 1:
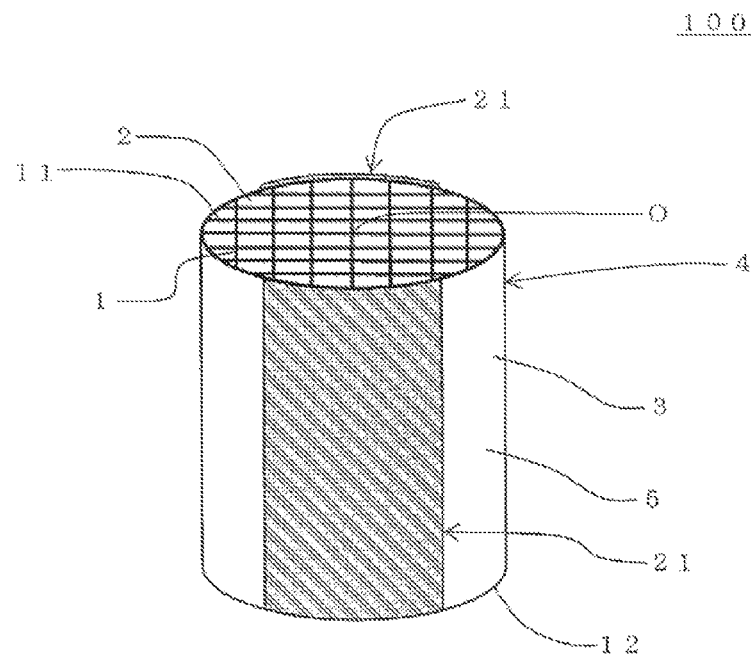
FIG. 1 is a perspective view schematically showing an embodiment of a honeycomb structure of the present invention.
Figure 2:
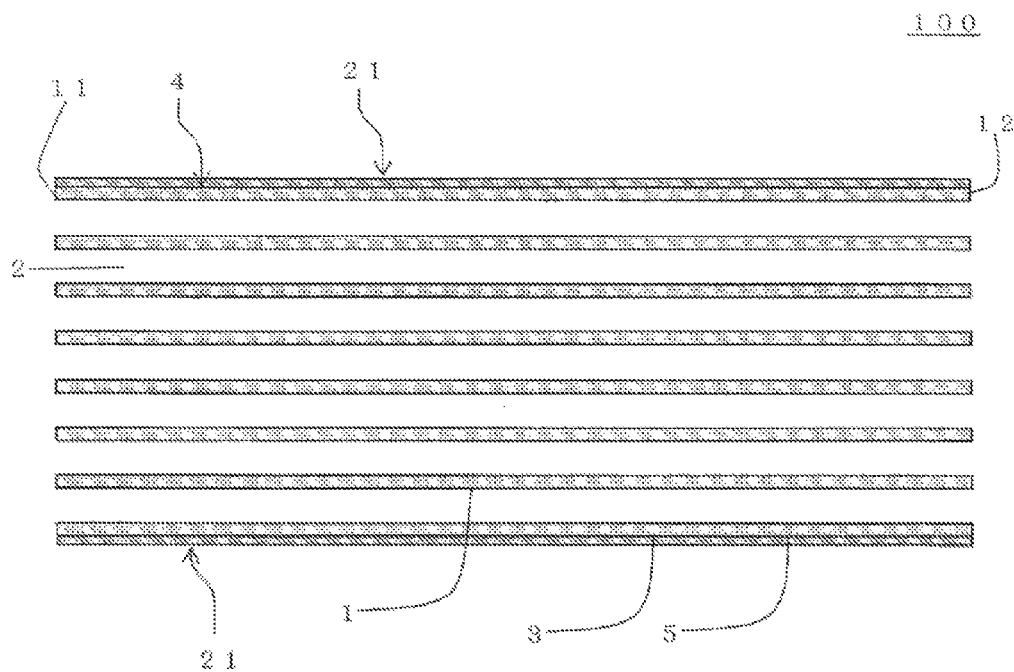
FIG. 2 is a schematic view showing a cross section parallel to the cell extension direction of an embodiment of a honeycomb structure of the present invention.
Figure 3:
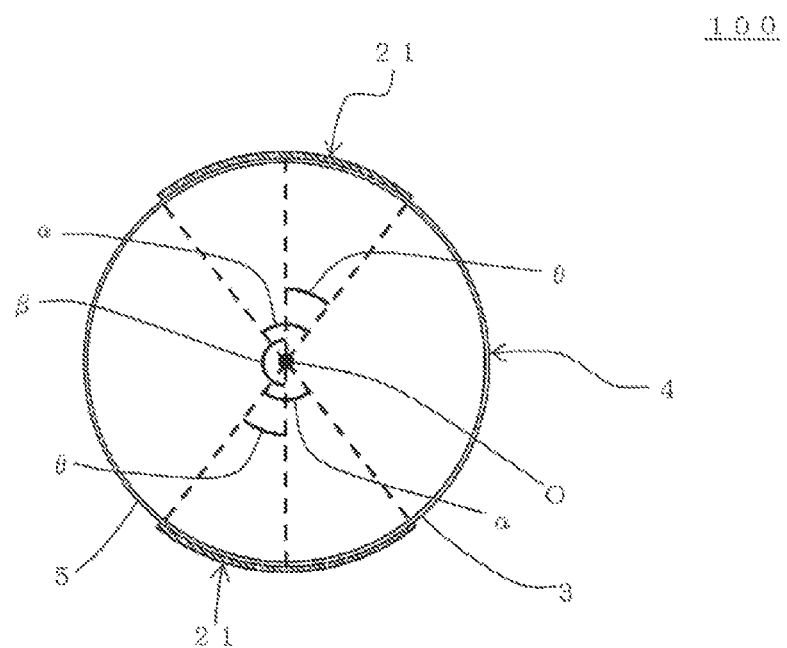
FIG. 3 is a schematic view showing a cross section perpendicular to the cell extension direction of an embodiment of a honeycomb structure of the present invention.

As shown in FIGS. 1 to 3, one embodiment of a honeycomb structure of the present invention is provided with a cylindrical honeycomb structure section 4 having porous partition walls 1 separating and forming a plurality of cells 2 extending from one end face 11 to the other end face 12 and functioning as fluid passages and an outer peripheral wall 3 located in the outermost periphery and a pair of electrode sections 21 disposed on the side face 5 of the honeycomb structure section 4. The honeycomb structure section 4 has an electrical resistivity of 1 to 200 Ωcm, and each of the pair of electrode sections 21, 21 is formed into a band-like shape extending in a cell 2 extension direction of the honeycomb structure section 4. In a cross section perpendicular to the cell 2 extension direction, one electrode section 21 of the pair of electrode sections 21, 21 is disposed across the center O of the honeycomb structure section 4 from the other electrode section 21 of the pair of electrode sections 21, 21. In a cross section perpendicular to the cell 2 extension direction, 0.5 times the central angle α (angle θ of 0.5 times the central angle α) of each of the electrode sections 21, 21 is 15 to 65°. FIG. 1 is a perspective view schematically showing an embodiment of a honeycomb structure of the present invention. FIG. 2 is a schematic view showing a cross section parallel to the cell extension direction of an embodiment of a honeycomb structure of the present invention. FIG. 3 is a schematic view showing a cross section perpendicular to the cell extension direction of an embodiment of a honeycomb structure of the present invention. Incidentally, in FIG. 3, partition walls are omitted.

Thus, in a honeycomb structure 100 of the present embodiment, since the honeycomb structure section 4 has an electrical resistivity of 1 to 200 Ωcm, even if a current is sent by the use of a power source having a high voltage, a current does not flow excessively, and the structure can suitably be used as a heater. In addition, since "each of the pair of electrode sections 21, 21 is formed into a band-like shape extending in the cell 2 extension direction of the honeycomb structure section 4; in a cross section perpendicular to the cell 2 extension direction, one electrode section 21 of the pair of electrode sections 21, 21 is disposed across the center of the honeycomb structure section 4 from the other electrode section 21 of the pair of electrode sections 21, 21; and, in a cross section perpendicular to the cell 2 extension direction, 0.5 times the central angle α (angle θ of 0.5 times the central angle α) of each of the electrode sections 21, 21 is 15 to 65°"; bias of a temperature distribution of the honeycomb structure section 4 at the time of applying a voltage between the pair of electrode sections 21 and 21. In particular, in a cross section perpendicular to the cell 2 extension direction, since the angle θ of 0.5 times the central angle α of each of the electrode sections 21, 21 is 15 to 65°, when a voltage is applied between the pair of electrode sections 21 and 21, bias of the current flowing through the honeycomb structure section 4 can be suppressed. This enables to suppress bias of heat generation in the honeycomb structure section 4.

Here, "in a cross section perpendicular to the cell 2 extension direction, one electrode section 21 of the pair of electrode sections 21, 21 is disposed across the center O of the honeycomb structure section 4 from the other electrode section 21 of the pair of electrode sections 21, 21" means that, in a cross section perpendicular to the cell 2 extension direction, the pair of electrode sections 21, 21 are disposed on the honeycomb structure section 4 in such a manner that an angle β (angle with the "center O" as the center (see FIG. 3)) formed by the "line segment connecting the central point (point at the center in the "peripheral direction of the honeycomb structure section 4") of one electrode section 21 and the center O of the honeycomb structure section 4" and the "line segment connecting the central point (point at the center in the "peripheral direction of the honeycomb structure section 4") of the other electrode section 21 and the center O of the honeycomb structure section 4" is within the range from 170 to 190°. In addition, as shown in FIG. 3, in a cross section perpendicular to the cell extension direction, the "central angle α of the electrode section 21" is the angle formed by two line segments connecting both the ends of the electrode section 21 and the center O of the honeycomb structure section 4 (interior angle of the portion of the center O in a shape (e.g., sector) formed by the "electrode section 21", "liner segment connecting an end portion of the electrode section 21 and the center O", and "liner segment connecting the other end portion of the electrode section 21 and the center O" in a cross section perpendicular to the cell extension direction).

In the honeycomb structure 100 of the present embodiment, it is preferable that the material for the partition walls 1 and the outer peripheral wall 3 contains a silicon-silicon carbide composite material or silicon carbide as the main component, and it is more preferable that the material is a silicon-silicon carbide composite material or silicon carbide. The "material for the partition walls 1 and the outer peripheral wall 3 contains silicon carbide particles and silicon as the main components" means that the partition walls 1 and the outer peripheral wall 3 contain silicon carbide particles and silicon at a ratio of 90 mass % or more of total. By the use of such a material, the electrical resistivity of the honeycomb structure section can be made 1 to 200 Ωcm. Here, the silicon-silicon carbide composite material contains silicon carbide particles as a framework and silicon as a bonding material for bonding silicon carbide particles together, and it is preferable that a plurality of silicon carbide particles are bonded together by silicon in such a manner that a pore is formed among silicon carbide particles. In addition, the silicon carbide is sintered silicon carbide. The electrical resistivity of the honeycomb structure section is a value at 400° C.

In the honeycomb structure 100 of the present embodiment, as shown in FIGS. 1 to 3, a pair of electrode sections 21, 21 are disposed on the side face 5 of the honeycomb structure section 4. The honeycomb structure 100 of the present embodiment generates heat by applying a voltage between the pair of electrode sections 21 and 21. The voltage to be applied is preferably 12 to 900V, more preferably 64 to 600V.

As shown in FIGS. 1 to 3, each of a pair of electrode sections 21, 21 is formed into a "band-like shape" extending in the cell 2 extension direction of the honeycomb structure section 4. In a cross section perpendicular to the cell 2 extension direction, one electrode section 21 of the pair of electrode sections 21, 21 is disposed across the center O of the honeycomb structure section 4 from the other electrode section 21 of the pair of electrode sections 21, 21. Further, in a cross section perpendicular to the cell 2 extension direction, 0.5 times the central angle $\alpha$ (angle $\theta$ of 0.5 times the central angle $\alpha$) of each of the electrode sections 21, 21 is 15 to 65°. Thus, since the electrode section 21 is formed into a band-like shape in such a manner that the longitudinal direction of the band-like shaped electrode section 21 extends in the cell 2 extension direction of the honeycomb structure section 4 and that a pair of the electrode sections 21, 21 are oppositely disposed across the center portion O of the honeycomb structure section 4, and, in a cross section perpendicular to the cell 2 extension direction, the angle $\theta$ of 0.5 times the central angle $\alpha$ of each of the electrode sections 21, 21 is specified to 15 to 65°, bias of the current flowing through the honeycomb structure section 4 can be suppressed when a voltage is applied between the pair of electrode sections 21 and 21, and therefore bias of heat generation in the honeycomb structure section 4 can be suppressed.

In a cross section perpendicular to the cell 2 extension direction, the upper limit of the "angle $\theta$ of 0.5 times the central angle $\alpha$" of the electrode section 21, 21 is preferably 60°, more preferably 55°. In addition, in a cross section perpendicular to the cell 2 extension direction, the lower limit of the "angle $\theta$ of 0.5 times the central angle $\alpha$" of the electrode section 21, 21 is preferably 20°, more preferably 30°. In addition, the "angle $\theta$ of 0.5 times the central angle $\alpha$" of one electrode section 21 is preferably 0.8 to 1.2 times, more preferably 1.0 times (the same size as) the "angle $\theta$ of 0.5 times the central angle $\alpha$" of the other electrode section 21. This enables to suppress bias of the current flowing through the honeycomb structure section 4 when a voltage is applied between the pair of electrode section s 21 and 21 and suppress bias of heat generation in the honeycomb structure section 4.

The thickness of the electrode section 21 is preferably 0.01 to 5 mm, more preferably 0.01 to 3 mm. Such a range enables to generate heat uniformly. When the thickness of the electrode section 21 is smaller than 0.01 mm, electrical resistance may be too high to generate heat uniformly. When it is larger than 5 mm, breakage may happen upon canning.

Figure 4:
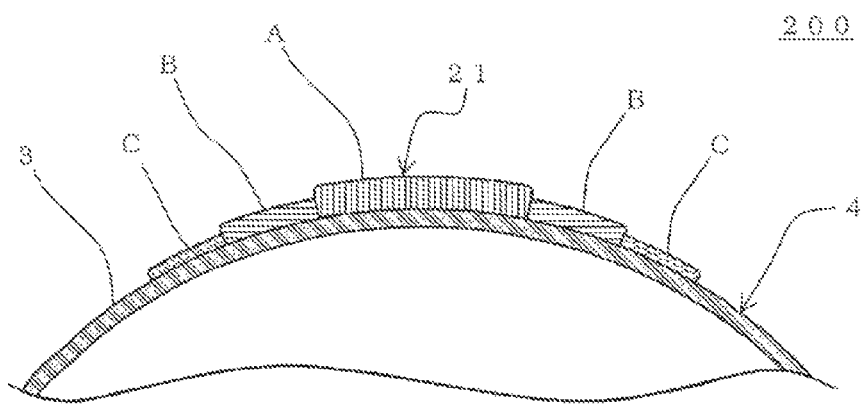
FIG. 4 is a schematic view showing a part of a cross section perpendicular to the cell extension direction of another embodiment of a honeycomb structure of the present invention.

As shown in FIG. 4, it is preferable that, in a cross section perpendicular to the cell extension direction, the electrode section 21 has a plurality of regions (region A in the electrode section, region B in the electrode section, and region C in the electrode section) arranged along the outer periphery of the honeycomb structure section 4 and is formed in such a manner that it is thickest in a region located at the center, thinner in a region closer to the outside, and thinnest in a region located at both the ends in a cross section perpendicular to the cell extension direction in a cross section perpendicular to the cell extension direction. Thus, by making the electrode section thinner toward the outside of the electrode section in a cross section perpendicular to the cell extension direction, bias of the temperature distribution of the honeycomb structure section can be reduced when a voltage is applied to the electrode section. When the electrode section has a plurality of regions, the number of the regions is not particularly limited, and about 2 to 4 is preferable (a smooth shape "having continuously changed thickness" with no step may be employed). FIG. 4 is a schematic view showing a part of a cross section perpendicular to the cell extension direction of another embodiment (honeycomb structure 200) of a honeycomb structure of the present invention. In FIG. 4, partition walls are omitted. Each of the conditions of the honeycomb structure 200 of the present embodiment is preferably the same as each of those of one embodiment (honeycomb structure 100) of a honeycomb structure of the present invention except that the electrode section 21 has a plurality of regions and becomes thinner toward the outside as described above.

It is preferable that the electrode section 21 contains silicon carbide particles and silicon as the main components and more preferable that it is formed of silicon carbide particles and silicon as the raw materials except for impurities generally contained therein. Here, "silicon carbide particles and silicon as the main components" means that the total mass of the silicon carbide particles and the silicon accounts for 90 mass % or more of mass of the entire electrode section. Thus, since the electrode section 21 contains silicon carbide particles and silicon as the main components, the components of the electrode section 21 are the same as or close to the components of the honeycomb structure section 4 (in the case that the material for the honeycomb structure section is silicon carbide), and therefore the thermal expansion coefficient of the electrode section 21 becomes the same as or close to that of the honeycomb structure section 4. In addition, since the material is the same or close, the bonding strength between the electrode section 21 and the honeycomb structure section 4 becomes high. Therefore, even if thermal stress is applied to the honeycomb structure, detachment of the electrode section 21 from the honeycomb structure section 4 and breakage of the bonded portions of the electrode sections 21 and the honeycomb structure section 4 can be inhibited.

As shown in FIGS. 1 and 2, in the honeycomb structure 100 of the present embodiment, each of a pair of electrode sections 21, 21 is formed into a band-like shape extending "over between both the end portions (between both the end faces 11 and 12" in the cell 2 extension direction of a honeycomb structure section 4. Thus, since a pair of electrode sections 21, 21 are disposed so as to extend over between both the end portions of the honeycomb structure section 4, bias of the current flowing through the honeycomb structure section 4 can be suppressed more effectively when a voltage is applied between the pair of electrode sections 21 and 21, and therefore bias of heat generation in the honeycomb structure section 4 can be suppressed more effectively. Here, "the electrode sections 21, 21 are formed (disposed) so as to extend over between both the end portions of the honeycomb structure section 4" means that one end portion of the electrode section 21 is brought into contact with one end portion (one end face) of the honeycomb structure section 4 and that the other end portion of the electrode section 21 is brought into contact with the other end portion (the other end face) of the honeycomb structure section 4.

Figure 8:
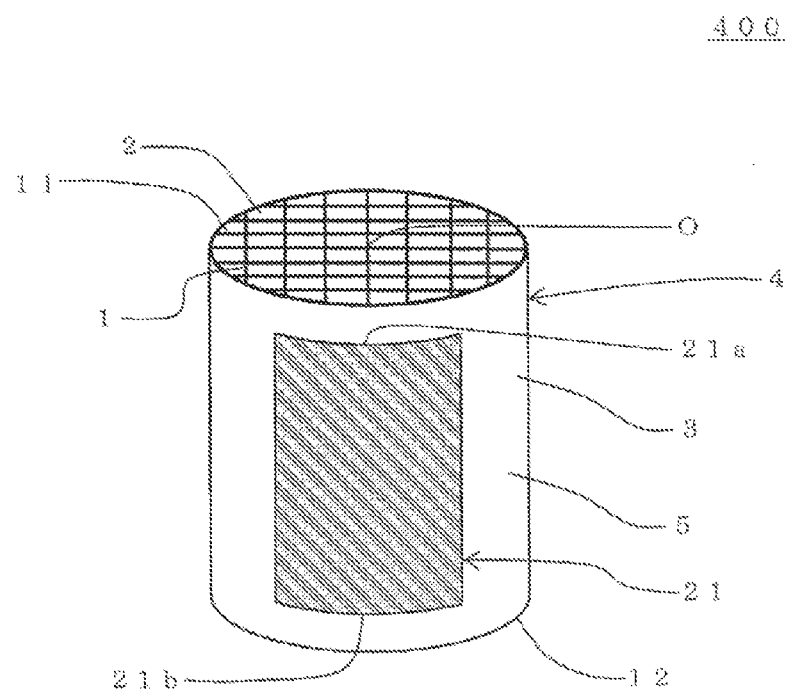
FIG. 8 is a perspective view schematically showing still another embodiment of a honeycomb structure of the present invention.
Figure 9:
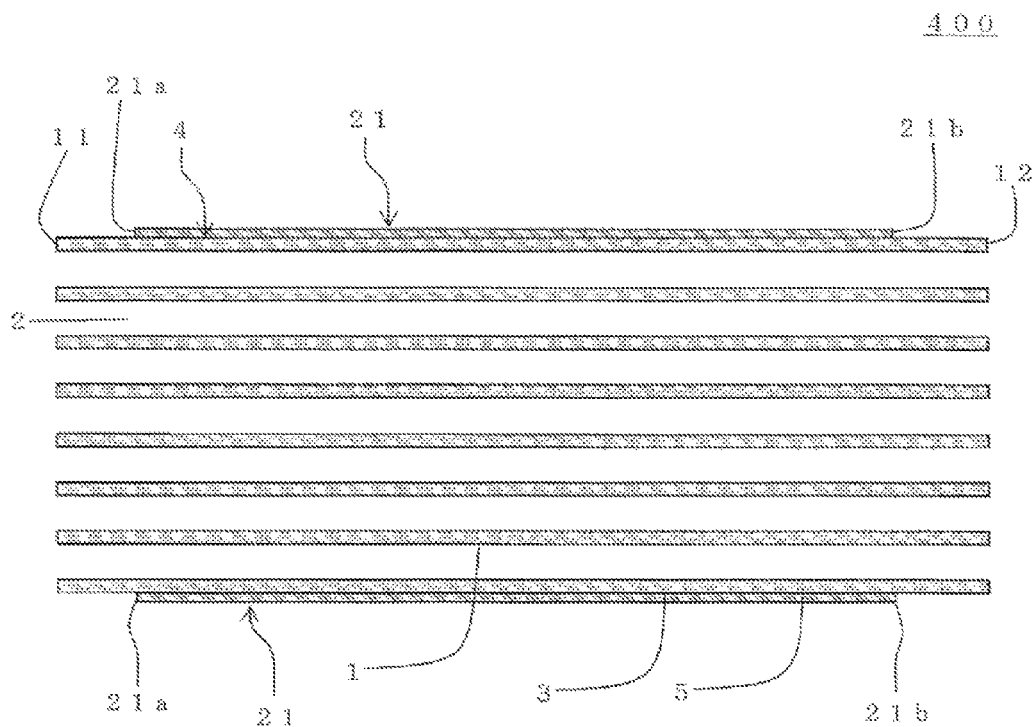
FIG. 9 is a schematic view showing a cross section parallel to a cell extension direction of still another embodiment of a honeycomb structure of the present invention.

It is preferable that the pair of electrode sections 21, 21 are formed so as to extend over between both the end portions of the honeycomb structure section 4 from the viewpoint of "more effectively suppressing bias of the current flowing through the honeycomb structure section 4 and thereby more effectively suppressing bias of the heat generation in the honeycomb structure 4". On the other hand, as shown in FIGS. 8 and 9, the state that neither of the end portions 21a, 21b in the "cell 2 extension direction of the honeycomb structure section 4" of the electrode sections 21 is brought into contact with both the end portions (both the end faces 11, 12) of the honeycomb structure section 4 is also a preferable embodiment. In addition, the state that one end portion 21a of the electrode section 21 is brought into contact with (reaches) one end portion (one end face 11) of the honeycomb structure section 4 while the other end portion 21b is not brought into contact with (does not reach) the other end portion (other end face 12) of the honeycomb structure section 4 is also a preferable embodiment. Thus, a structure where at least one end portion of the electrode section 21 is not brought into contact with (does not reach) the end portion (end face) of the honeycomb structure section 4 enables to improve thermal shock resistance of the honeycomb structure. That is, in each of the pair of electrode sections 21, 21, it is preferable that at least one end portion is not brought into contact with (does not reach) an end portion (end face) of the honeycomb structure section 4 from the viewpoint of "improving thermal shock resistance of the honeycomb structure". From the above, it is preferable that the pair of electrode sections 21, 21 are formed to extend over between both the end portions of the honeycomb structure section 4 in the case of placing a high value on the viewpoint of "more effectively suppressing bias of a current flowing in the honeycomb structure section 4, thereby more effectively suppressing bias of heat generation of the honeycomb structure section 4" while it is preferable that at least one end portion of each of the pair of electrode sections 21, 21 is not brought into contact with (does not reach) an end portion (end face) of the honeycomb structure section 4 in the case of placing a high value on the viewpoint of "improving thermal shock resistance of the honeycomb structure".

In addition, the distance from one end portion 21a of one electrode section 21 of the pair of electrode sections 21, 21 to "one end portion (one end face 11) of the honeycomb structure section 4" is preferably the same as or may be different from the distance from one end portion 21a of the other electrode section 21 of the pair of electrode sections 21, 21 to "one end portion (one end face 11) of the honeycomb structure section 4". In addition, the distance from the other end portion 21b of one electrode section 21 of the pair of electrode sections 21, 21 to "the other end portion (the other end face 12) of the honeycomb structure section 4" is preferably the same as or may be different from the distance from the other end portion 21b of the other electrode section 21 of the pair of electrode sections 21, 21 to "the other end portion (the other end face 12) of the honeycomb structure section 4". Incidentally, one end portion 21a of the electrode section 21 is the end portion facing one end portion (one end face 11) side of the honeycomb structure section 4, and the other end portion 21b of the electrode section 21 is the end portion facing the other end portion (the other end face 12) side of a honeycomb structure section 4. FIG. 8 is a perspective view schematically showing still another embodiment (honeycomb structure 400) of a honeycomb structure of the present invention. FIG. 9 is a schematic view showing a cross section parallel to the cell extension direction of still another embodiment (honeycomb structure 400) of a honeycomb structure of the present invention. Each of the conditions of the honeycomb structure 400 of the present embodiment is preferably the same as each of the conditions of one embodiment (honeycomb structure 100) of a honeycomb structure of the present invention except that at least one end portion of the electrode section 21 is not brought into contact with (does not reach) the end portion (end face) of the honeycomb structure section 4.

In the case that at least one end portion of the electrode section 21 is not brought into contact with (does not reach) the end portion (end face) of the honeycomb structure section 4, the distance between the "end portion of the electrode section 21" which is not brought into contact and "the end portion (end face) of the honeycomb structure section" is preferably 50% or less, more preferably 25% or less, of the length of the honeycomb structure section 4 in the cell 2 extension direction. When it is longer than 50%, it may be difficult to suppress bias of a current flowing in a honeycomb structure section 4 when a voltage is applied between the pair of electrode sections 21 and 21.

In a honeycomb structure of the present embodiment, for example, as shown in FIGS. 1 to 3, the electrode section 21 has a shape where a planar rectangular member is curved along the outer periphery of the cylindrical shape. Here, the shape obtained by changing the shape of the curved electrode section 21 to be a shape of a planar member with no curve is referred to as a "planar shape" of the electrode section 21. The aforementioned "planar shape" of the electrode section 21 shown in FIGS. 1 to 3 is rectangular. In addition, the "outer peripheral shape of an electrode section" means the "outer peripheral shape of a planar shape of the electrode section".

Figure 10:
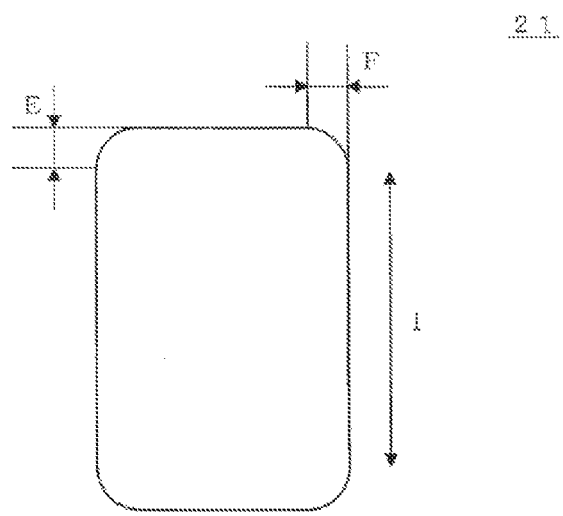
FIG. 10 is a plan view schematically showing an electrode section.
Figure 11:
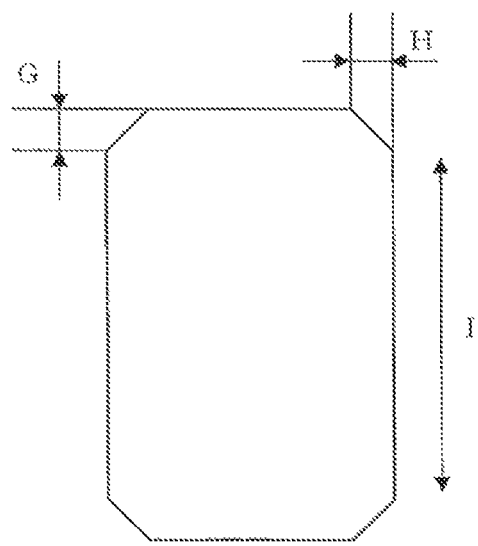
FIG. 11 is a plan view schematically showing an electrode section.

In a honeycomb structure of the present embodiment, as shown in FIGS. 1 to 3, the outer peripheral shape of the band-like shaped electrode section 21 may be rectangular. However, as shown in FIG. 10, as a preferable embodiment, the outer peripheral shape of the band-like shaped electrode section 21 is a shape where the corner portions of the rectangle are formed in a curved fashion. In addition, as shown in FIG. 11, it is also a preferable embodiment that the outer peripheral shape of the band-like shaped electrode section 21 is a shape where the corner portions of the rectangle are linearly chamfered.

The outer peripheral shape of an electrode section 21 shown in FIG. 10 is a shape where the four corner portions of the rectangle are formed in a curved fashion. Though it is a preferable embodiment that the outer peripheral shape of the electrode section 21 is a shape where the four corner portions of the rectangle are formed into a curved shape, it is sufficient that at least one corner portion is formed in a curved fashion. By thus specifying the outer peripheral shape of the electrode section 21 to the shape where at least one corner portion of the rectangle is formed in a curved fashion, thermal shock resistance of the honeycomb structure can be improved. When the corner portions of the electrode section are orthogonally formed, the stress in the vicinity of the "corner portions of the electrode section" in the honeycomb structure section tends to be relatively high in comparison with the other portion while, when the corner portions of the electrode section are formed in a curved fashion, it becomes possible to reduce the stress in the vicinity of the "corner portions of the electrode section" in the honeycomb structure section.

Though the corner portions formed in a curved fashion are preferably arc-like as shown in FIG. 10, they may have a curved shape other than an arc. In addition, though it is preferable that the corner portions formed in a curved fashion and portions corresponding to the "sides" of the rectangle are smoothly connected to each other (the tangent line at each of the connected portions is common), pointed connected portions may be formed so as to form apexes. When a pointed connected portion is formed, the interior angle of the connected portion is preferably 90° or more. Incidentally, the connected portion is a portion where a straight line and a straight line, a curved line and a straight line, or a curved line and a curved line are connected to each other. For example, in a case of a rectangle, it is a corner portion (an apex portion) where two sides are connected to each other. In addition, as shown in FIG. 10, though the corner portion formed in a curved fashion has a convex shape toward the outside, it may have a convex shape toward the inside (concave shape toward the outside). When the corner portion formed in a curved fashion is a convex toward the inside, the interior angle of the connected portion is preferably 90° or more. The "interior angle" in the case where a curved line and a straight line are connected to each other is the angle between the straight line and the tangent line of the curved line in the connected portion.

The length E (length of the corner portion in the cell direction) "in the cell extension direction I" of a "corner portion formed in a curved fashion" is preferably 2 to 35%, more preferably 5 to 25%, of the length "in the cell extension direction I" of the electrode section 21. When it is shorter than 2%, the effect of improving thermal shock resistance of the honeycomb structure may be reduced. When it is longer than 35%, it may become difficult to generate heat uniformly when a voltage is applied to the honeycomb structure. In addition, the length F (length in the perpendicular direction of the corner portion) "in the direction perpendicular to the cell extension direction I" of the "corner portion formed in a curved fashion" is preferably 2 to 35%, more preferably 5 to 25%, of the length "in the direction perpendicular to the cell extension direction I" of the electrode section 21. When it is shorter than 2%, the effect of improving thermal shock resistance of the honeycomb structure may be reduced. When it is longer than 35%, it may become difficult to generate heat uniformly when a voltage is applied to the honeycomb structure.

In addition, the outer peripheral shape of the electrode section 21 shown in FIG. 11 is a shape where the four corner portions of the rectangle are linearly chamfered. Though it is also a preferable embodiment that, in the outer peripheral shape of the electrode section 21, the four corner portions of the rectangle are thus linearly chamfered, a shape where at least one corner portion is linearly chamfered is sufficient. By allowing the outer peripheral shape of the electrode section 21 to have a shape where at least one corner portion of the rectangle is linearly chamfered, an effect similar to that obtained at the time of allowing the "outer peripheral shape of the electrode section 21 to have a shape where at least one corner portion of the rectangle is formed in a curved fashion" can be obtained. However, a higher effect can be obtained by a corner portion formed in a curved fashion.

The length G (length of the corner portion in the cell direction) "in the cell extension direction I" of the "corner portion linearly chambered" is preferably 2 to 35%, more preferably 5 to 25%, of the length "in the cell extension direction I" of the electrode section 21. When it is shorter than 2%, the effect of improving thermal shock resistance of the honeycomb structure may be reduced. When it is longer than 35%, it may become difficult to generate heat uniformly when a voltage is applied to the honeycomb structure. The length H (length of the corner portion in the perpendicular direction) "in the direction perpendicular to the cell extension direction I" of the "corner portion linearly chambered" is preferably 2 to 35%, more preferably 5 to 25%, of the length "in the direction perpendicular to the cell extension direction I" of the electrode section 21. When it is shorter than 2%, the effect of improving thermal shock resistance of the honeycomb structure may be reduced. When it is longer than 35%, it may become difficult to generate heat uniformly when a voltage is applied to the honeycomb structure. In addition, the outer peripheral shape of the electrode section 21 may be a rectangle having both a corner portion formed in a curved fashion and a corner portion linearly chamfered.

Figure 12:
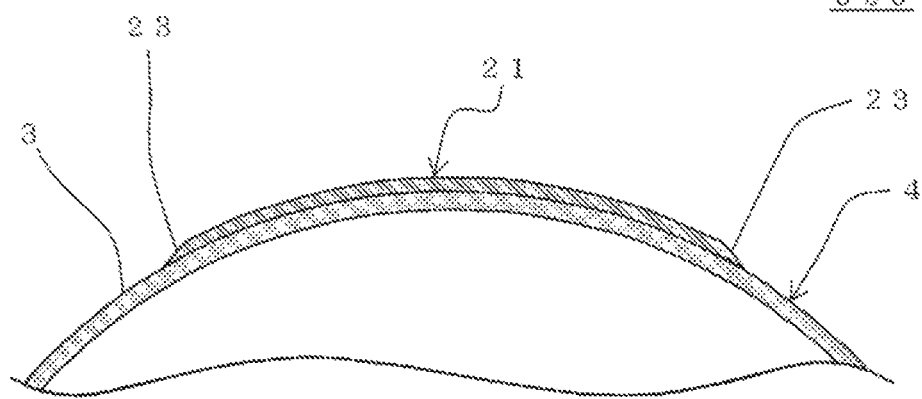
FIG. 12 is a schematic view showing a part of a cross section perpendicular to the cell extension direction of still another embodiment of a honeycomb structure of the present invention.

In addition, as shown in FIG. 12, it is preferable that both the end portions 23, 23 in the "peripheral direction of the honeycomb structure section 4" of the electrode section 21 are formed to be gradually (continuously) thinner toward the outside in the "peripheral direction of the honeycomb structure section 4". Each of the "portions (both the end portions 23, 23) formed so as to be gradually (continuously) thinner" is preferably within the range from 3 to 10 mm in the "peripheral direction of the honeycomb structure section 4". Incidentally, the "portions (both the end portions 23, 23) formed so as to be gradually (continuously) thinner" are thinnest at the tips (very tips) in the "peripheral direction of the honeycomb structure section 4". FIG. 12 is a schematic view showing a part of a cross section perpendicular to the cell extension direction of still another embodiment (honeycomb structure 500) of a honeycomb structure of the present invention.

The electrical resistivity of the electrode section 21 is preferably 0.1 to 100 Ωcm, more preferably 0.1 to 50 Ωcm. By allowing the electrical resistivity of the electrode section 21 to be in such a range, a pair of electrode sections 21, 21 effectively play a role of an electrode in a pipe where high temperature exhaust gas flows. When the electrical resistivity of the electrode section 21 is smaller than 0.1 Ωcm, temperature of the honeycomb portion in the vicinity of both the ends of the electrode section 21 in a cross section perpendicular to the cell extension direction may easily rise. When the electrical resistivity of the electrode section 21 is larger than 100 Ωcm, since the current hardly flows, it may become difficult to play a role of an electrode. The electrical resistivity of the electrode section is a value at 400° C.

The porosity of the electrode section 21 is preferably 30 to 60%, more preferably 30 to 55%. When the porosity of the electrode section 21 is in such a range, suitable electrical resistivity can be obtained. When the porosity of the electrode section 21 is lower than 30%, deformation may be caused upon manufacturing. When the porosity of the electrode section 21 is higher than 60%, the electrical resistivity may become too high. The porosity is a value measured by a mercury porosimeter.

In the electrode section 21, the average pore size is preferably 5 to 45 µm, more preferably 7 to 40 µm. When the average pore size of the electrode section 21 is in such a range, suitable electrical resistivity can be obtained. When the average pore size of the electrode section 21 is smaller than 5 µm, the electrical resistivity may become too high. When the average pore size of the electrode section 21 is larger than 45 µm, the strength of the electrode section 21 may become low, which may easily cause breakage. The average pore size is a value measured by a mercury porosimeter.

In the case that the main components of the electrode section 21 are silicon carbide particles and silicon, the average particle diameter of the silicon carbide particles contained in the electrode section 21 is preferably 10 to 60 µm, more preferably 20 to 60 µm. By allowing the average particle diameter of the silicon carbide particles contained in the electrode section 21 to be in such a range, the electrical resistivity of the electrode section 21 can be controlled to be in the range from 0.1 to 100 Ωcm. When the average pore size of the silicon carbide particles contained in the electrode section 21 is smaller than 10 µm, the electrical resistivity of the electrode section 21 may become too large. When the average pore size of the silicon carbide particles contained in the electrode section 21 is larger than 60 µm, the strength of the electrode section 21 may become low, which may easily cause breakage. The average particle diameter of the silicon carbide particles contained in the electrode section 21 is a value measured by a laser diffraction method.

The mass ratio of the silicon contained in the electrode section 21 with respect to the "total mass of the silicon carbide particles and silicon" contained in the electrode section 21 is preferably 20 to 40 mass %, more preferably 25 to 35 mass %.

By allowing the mass ratio of the silicon with respect to the "total mass of the silicon carbide particles and silicon" contained in the electrode section 21 to be in such a range, the electrical resistivity of the electrode section 21 can be in the range from 0.1 to 100 Ωcm. When the mass ratio of the silicon contained in the electrode section 21 with respect to the "total mass of the silicon carbide particles and silicon" contained in the electrode section 21 is smaller than 20 mass %, the electrical resistivity may become too large while, when it is larger than 40 mass %, deformation may easily be caused upon manufacturing.

In the honeycomb structure 100 of the present embodiment, the partition wall thickness is 50 to 200 μm, preferably 70 to 130 μm. By allowing the partition wall thickness to be in such a range, even if a catalyst is loaded on the honeycomb structure 100 used as a catalyst carrier, pressure loss upon sending exhaust gas can be inhibited from increasing too much. When the partition wall thickness is smaller than 50 μm, the strength of the honeycomb structure may be reduced. When the partition wall thickness is larger than 200 μm, in the case of loading a catalyst on the honeycomb structure 100 used as a catalyst carrier, pressure loss upon sending exhaust gas may increase.

In the honeycomb structure 100 of the present embodiment, the cell density is preferably 40 to 150 cells/cm$^2$, more preferably 70 to 100 cells/cm$^2$. By allowing the cell density to be in such a range, purification performance of the catalyst can be raised in a state of low pressure loss upon sending exhaust gas. When the cell density is lower than 40 cells/cm$^2$, the catalyst-carrying area may be reduced. When the cell density is higher than 150 cells/cm$^2$, pressure loss upon sending exhaust gas may become large in the case of loading a catalyst on the honeycomb structure 100 used as a catalyst carrier.

In a honeycomb structure 100 of the present embodiment, the average particle diameter of the silicon carbide particles (framework) constituting the honeycomb structure section 4 is preferably 3 to 50 μm, more preferably 3 to 40 μm. By allowing the average particle diameter of the silicon carbide particles constituting the honeycomb structure section 4 to be within such a range, the electrical resistivity at 400° C. of the honeycomb structure section 4 can be made within the range from 1 to 200 Ωcm. When the average particle diameter of the silicon carbide particles is smaller than 3 μm, the electrical resistivity of the honeycomb structure section 4 may become large. When the average particle diameter of the silicon carbide particles is larger than 50 μm, the electrical resistivity of the honeycomb structure section 4 may become small. Further, when the average particle diameter of the silicon carbide particles is larger than 50 μm, the die for extrusion may be clogged with the forming raw material upon forming a honeycomb formed body by extrusion. The average particle diameter of the silicon carbide particles is a value measured by a laser diffraction method.

In the honeycomb structure 100 of the present embodiment, the electrical resistivity of the honeycomb structure section 4 is 1 to 200 Ωcm, preferably 10 to 100 Ωcm. When the electrical resistivity is smaller than 1 Ωcm, a current may flow excessively when the honeycomb structure 100 is electrified by a power source having a high voltage of for example, 200V or more (the voltage is not limited to 200V). When the electrical resistivity is larger than 200 Ωcm, a current may hardly flow when the honeycomb structure 100 is electrified by a power source having a high voltage of, for example, 200V or more (the voltage is not limited to 200V), and therefore heat generation may become insufficient. The electrical resistivity of the honeycomb structure section is a value measured by a four-terminal method.

In the honeycomb structure 100 of the present embodiment, the electrical resistivity of the electrode section 21 is preferably lower than that of the honeycomb structure section 4, and the electrical resistivity of the electrode section 21 is more preferably 20% or less, particularly preferably 1 to 10%, of the electrical resistivity of the honeycomb structure section 4. By allowing the electrical resistivity of the electrode section 21 to be 20% or less of the electrical resistivity of the honeycomb structure section 4, the electrode section 21 can function as an electrode more effectively.

In the honeycomb structure 100 of the present embodiment, in the case that the material for the honeycomb structure section 4 is a silicon-silicon carbide composite material, the ratio of "mass of silicon as the bonding material" contained in the honeycomb structure section 4 with respect to the total of "mass of the silicon carbide particles as the framework" contained in the honeycomb structure section 4 and "mass of silicon as the bonding material" contained in the honeycomb structure section 4" is preferably 10 to 40 mass %, more preferably 15 to 35 mass %. When it is lower than 10 mass %, strength of the honeycomb structure may be reduced. When it is higher than 40 mass %, it may be impossible to maintain the shape upon firing.

The porosity of the partition walls 1 of the honeycomb structure section 4 is preferably 35 to 60%, more preferably 35 to 45%. When the porosity is below 35%, deformation upon firing may be large. When the porosity is above 60%, strength of the honeycomb structure may be low. The porosity is a value measured by a mercury porosimeter.

The average pore size of the partition walls 1 of the honeycomb structure section 4 is preferably 2 to 15 μm, more preferably 4 to 8 μm. When the average pore size is smaller than 2 μm, the electrical resistivity may become too large. When the average pore size is larger than 15 μm, the electrical resistivity may become too small. The average pore size is a value measured by a mercury porosimeter.

In addition, the thickness of the outer peripheral wall 3 constituting the outermost periphery of the honeycomb structure 100 of the present embodiment is preferably 0.1 to 2 mm. When it is smaller than 0.1 mm, the strength of the honeycomb structure 100 may be low. When it is larger than 2 mm, the area of the partition walls where a catalyst is loaded may become small.

In a honeycomb structure 100 of the present embodiment, the shape of the cell 2 in a cross section perpendicular to the cell 2 extension direction is preferably a quadrangle, a hexagon, an octagon, or a combination thereof. By such a cell shape, pressure loss upon sending exhaust gas into the honeycomb structure 100 becomes small, and purification performance of the catalyst becomes excellent.

The shape of the honeycomb structure of the present embodiment is not particularly limited and may be, for example, a cylindrical shape having a circular bottom face (circular cylindrical shape), a cylindrical shape having an oval bottom face, a cylindrical shape having a polygonal (quadrangular, octagonal, hexagonal, heptagonal, octagonal, etc.) bottom face, or the like. As the size of the honeycomb structure, the area of the bottom face is preferably 2000 to 20000 mm$^2$, more preferably 4000 to 10000 mm$^2$. In addition, the length of the honeycomb structure in the central axial direction is preferably 50 to 200 mm, more preferably 75 to 150 mm.

The isostatic strength of the honeycomb structure 100 of the present embodiment is 1 MPa or more, more preferably 3 MPa or more. Though the higher isostatic strength is more preferable, the upper limit is about 6 MPa in consideration of the material, structure, and the like of the honeycomb structure 100. When the isostatic strength is below 1 MPa, breakage may easily be caused when the honeycomb structure is used as a catalyst carrier or the like. The isostatic strength is a value measured by applying hydrostatic pressure in water.

Figure 5:
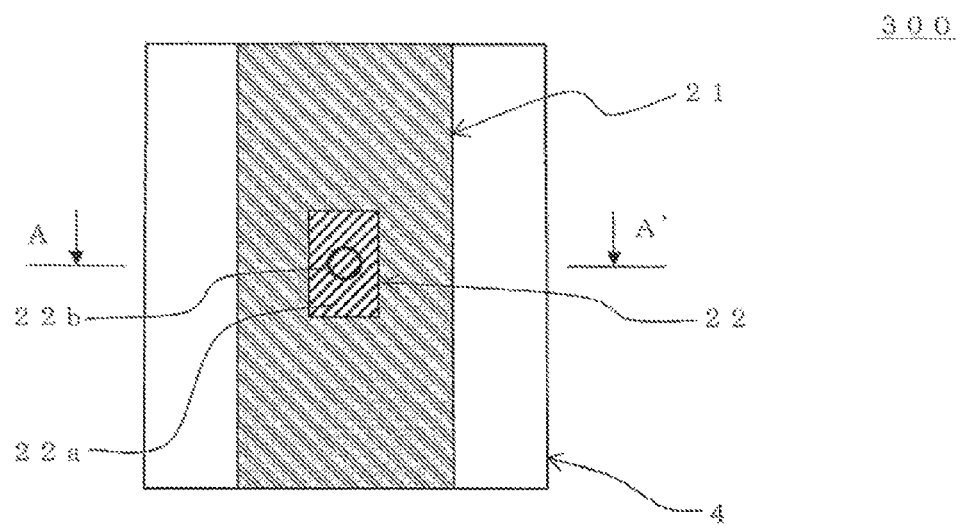
FIG. 5 is a front view schematically showing another embodiment of a honeycomb structure of the present invention.
Figure 6:
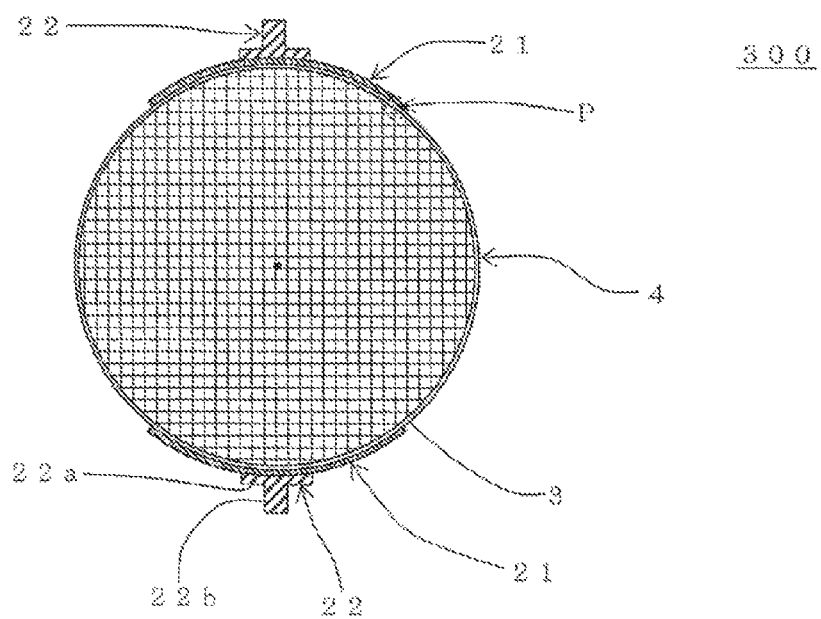
FIG. 6 is a schematic view showing the A-A' cross section in FIG. 5.
Figure 7:
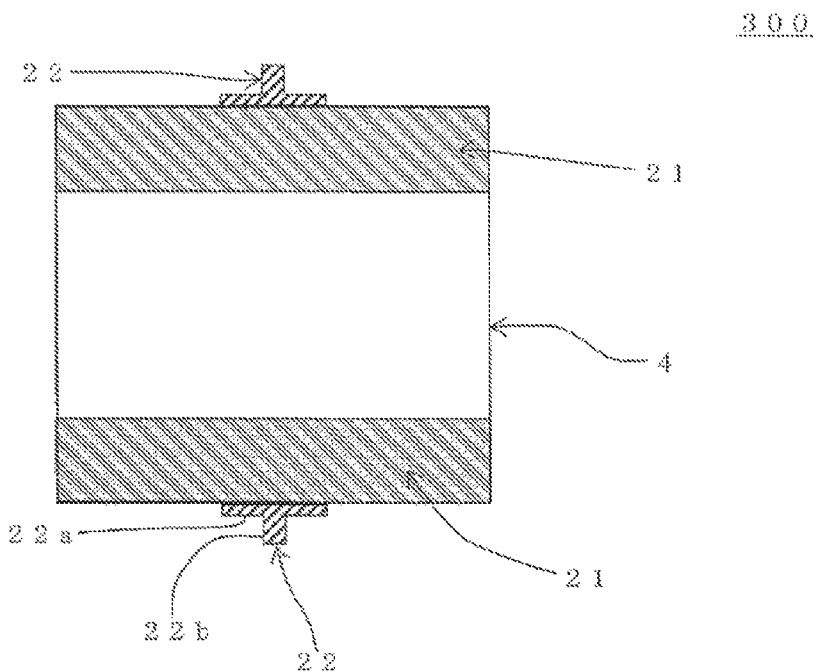
FIG. 7 is a side view schematically showing still another embodiment of a honeycomb structure of the present invention.

Next, still another embodiment of a honeycomb structure of the present invention will be described. As shown in FIGS. 5 to 7, in a honeycomb structure 300 of the present embodiment, an electrode terminal protruding portion 22 for connecting an electric wire is disposed in the center portion in a cross section perpendicular to the cell extension direction of each of the electrode sections 21, 21 and center portion in the cell extension direction of the aforementioned honeycomb structure 100 (see FIGS. 1 to 3) of the present invention. The electrode terminal protruding portion 22 is a portion for connecting a wire from a power source in order to apply a voltage between the electrode sections 21 and 21. By the disposition of the electrode terminal protruding portion 22 in the center portion in a cross section perpendicular to the cell extension direction and center portion in the cell extension direction of each of the electrode sections 21, 21, bias of the temperature distribution of the honeycomb structure section can be reduced when a voltage is applied to the electrode sections. FIG. 5 is a front view schematically showing still another embodiment of a honeycomb structure of the present invention. FIG. 6 is a schematic view showing the A-A' cross section in FIG. 5. FIG. 7 is a side view schematically showing still another embodiment of a honeycomb structure of the present invention.

Each of the conditions of the honeycomb structure 300 of the present embodiment is preferably the same as each of those of one embodiment (honeycomb structure 100) of a honeycomb structure of the present invention except that "an electrode terminal protruding portion 22 for connecting an electric wire is disposed in the center portion in across section perpendicular to the cell 2 extension direction of each of the electrode sections 21, 21 and center portion in the cell 2 extension direction".

When the main components of the electrode section 21 are silicon carbide particles and silicon, it is preferable that the main components of the electrode terminal protruding portion 22 are also silicon carbide particles and silicon. By thus allowing the electrode terminal protruding portion 22 to have silicon carbide particles and silicon as the main components, the components of the electrode section 21 are the same as (or close to) the components of the electrode terminal protruding portion 22, and therefore the thermal expansion coefficient of the electrode section 21 becomes the same as (or close to) that of the electrode terminal protruding portion 22. In addition, since the material is the same or close, the bonding strength between the electrode section 21 and the electrode terminal protruding portion 22 becomes high. Therefore, even if thermal stress is applied to the honeycomb structure, detachment of the electrode terminal protruding portion 22 from the electrode section 21 and breakage of the bonded portions of the electrode terminal protruding portion 22 and the electrode sections 21 can be inhibited. Here, "the electrode terminal protruding portion 22 contains silicon carbide particles and silicon as the main components" means that the electrode terminal protruding portion 22 contains silicon carbide particles and silicon at a ratio of 90 mass % or more of total.

The shape of the electrode terminal protruding portion 22 is not particularly limited as long as it is connected to the electrode section 21 and has a shape where an electric wire can be connected. For example, as shown in FIGS. 5 to 7, it is preferable that the electrode terminal protruding portion 22 has a shape where a circular columnar protruding portion 22b is disposed on a quadrangular plate-like substrate 22a. Such a shape enables the electrode terminal protruding portion 22 to be firmly bonded to the electrode section 21 by the substrate 22a and enables an electric wire to be securely bonded to the protruding portion 22b.

In the electrode terminal protruding portion 22, the thickness of the substrate 22a is preferably 1 to 5 mm. Such thickness enables to securely bond the electrode terminal protruding portion 22 to the electrode section 21. When it is smaller than 1 mm, the substrate 22a is weak, and the protruding portion 22b may easily be detached from the substrate 22a. When it is larger than 5 mm, the space for disposing the honeycomb structure may become larger than necessary.

In the electrode terminal protruding portion 22, the length (width) in the "outer peripheral direction in a cross section perpendicular to the cell extension direction of the honeycomb structure section 4" of the substrate 22a is preferably 10 to 50%, more preferably 20 to 40%, of the length in the "outer peripheral direction in a cross section perpendicular to the cell extension direction of the honeycomb structure section 4" of the electrode section 21. By such a range, the electrode terminal protruding portion 22 is hardly detached from the electrode section 21. When it is shorter than 10%, the electrode terminal protruding portion 22 may easily be detached from the electrode section 21. When it is longer than 50%, the mass may become large. In the electrode terminal protruding portion 22, the length of the substrate 22a in the "cell 2 extension direction" is preferably 5 to 30% of the length of the honeycomb structure section 4 in the cell extension direction. The length of the substrate 22a in the "cell 2 extension direction" in such a range enables to obtain sufficient bonding strength. When the length of the substrate 22a in the "cell 2 extension direction" is smaller than 5% of the length of the honeycomb structure section 4 in the cell extension direction, detachment from the electrode section 21 may easily be caused. When it is larger than 30%, the mass may be large.

In the electrode terminal protruding portion 22, the thickness of the protruding portion 22b is preferably 3 to 15 mm. Such thickness enables to securely connect an electric wire to the protruding portion 22b. When it is smaller than 3 mm, the protruding portion 22b may break easily. When it is larger than 15 mm, it may be difficult to connect an electric wiring. In addition, the length of the protruding portion 22b is preferably 3 to 20 mm. Such length enables to securely connect an electric wire to the protruding portion 22b. When it is smaller than 3 mm, it may be difficult to connect an electric wiring. When it is larger than 20 mm, the protruding portion 22b may break easily.

The electrical resistivity of the electrode terminal protruding portion 22 is preferably 0.1 to 2.0 $\Omega$cm, more preferably 0.1 to 1.0 $\Omega$cm. The electrical resistivity of the electrode terminal protruding portion 22 in such a range enables to efficiently supply a current to the electrode section 21 from the electrode terminal protruding portion 22 in a pipe where exhaust gas at high temperature flows. When the electrical resistivity of the electrode terminal protruding portion 22 is larger than 2.0 $\Omega$cm, a current hardly flows, and therefore it becomes difficult to supply a current to the electrode section 21.

The electrode terminal protruding portion 22 has a porosity of preferably 30 to 45%, more preferably 30 to 40%. The porosity of the electrode terminal protruding portion 22 in such a range enables to obtain an appropriate electrical resistivity. When the porosity of the electrode terminal protruding portion 22 is higher than 45%, the strength of the electrode terminal protruding portion 22 may be low. In particular, when the strength of the protruding portion 22b is low, the protruding portion 22b may break easily. The porosity is a value measured by a mercury porosimeter.

The electrode terminal protruding portion 22 has an average pore size of preferably 5 to 20 μm, more preferably 7 to 15 μm. The average pore size of the electrode terminal protruding portion 22 within such a range enables to obtain an appropriate electrical resistivity. When the average pore size of the electrode terminal protruding portion 22 is larger than 20 μm, the strength of the electrode terminal protruding portion 22 may be low. In particular, when the strength of the protruding portion 22b is low, the protruding portion 22b may break easily. The average pore size is measured by a mercury porosimeter.

When the main components of the electrode terminal protruding portion 22 are silicon carbide particles and silicon, the average particle diameter of the silicon carbide particles contained in the electrode terminal protruding portion 22 is preferably 10 to 60 μm, more preferably 20 to 60 μm. The average particle diameter of the silicon carbide particles contained in the electrode terminal protruding portion 22 within such a range enables an electrical resistivity of the electrode terminal protruding portion 22 to be 0.1 to 2.0 Ωcm. When the average pore size of the silicon carbide particles contained in electrode terminal protruding portion 22 is smaller than 10 μm, the electrical resistivity of the electrode terminal protruding portion 22 may be too large. When the average pore size of the silicon carbide particles contained in electrode terminal protruding portion 22 is larger than 60 μm, the electrical resistivity of the electrode terminal protruding portion 22 may be too small. The average particle diameter of the silicon carbide particles contained in the electrode terminal protruding portion 22 is a value measured by a laser diffraction method.

The mass ratio of the silicon contained in the electrode terminal protruding portion 22 with respect to the "total mass of the silicon carbide particles and silicon" contained in the electrode terminal protruding portion 22 is preferably 20 to 40 mass %, more preferably 25 to 35 mass %. By allowing the mass ratio of the silicon contained in the electrode terminal protruding portion 22 with respect to the "total of mass of the silicon carbide particles and silicon" contained in the electrode terminal protruding portion 22 to be in such a range, it becomes easy to obtain the electrical resistivity of 0.1 to 2.0 Ωcm. When the mass ratio of the silicon with respect to the "total mass of the silicon carbide particles and silicon" contained in the electrode terminal protruding portion 22 is smaller than 20 mass %, the electrical resistivity may become too large while, when it is larger than 40 mass %, deformation may be caused upon manufacturing.

(2) Method for Manufacturing a Honeycomb Structure:

Next, a method for manufacturing a honeycomb structure of the present invention will be described. There will be shown a method for manufacturing a honeycomb structure 300 (see FIGS. 5 to 7) as still another embodiment of a honeycomb structure of the present invention described above.

In the first place, a forming raw material is manufactured by adding a metal silicon powder (metal silicon), a binder, a surfactant, a pore former, water and the like to a silicon carbide powder (silicon carbide). The mass of the metal silicon is preferably 10 to 40 mass % with respect to the total of the mass of the silicon carbide powder and the mass of the metal silicon. The average particle diameter of the silicon carbide particles in the silicon carbide powder is 3 to 50 μm, more preferably 3 to 40 μm. The average particle diameter of the metal silicon (metal silicon powder) is preferably 2 to 35 μm. The average particle diameters of the silicon carbide particles and metal silicon (metal silicon particles) are values measured by a laser diffraction method. The silicon carbide particles are silicon carbide microparticles constituting the silicon carbide powder, and the metal silicon particles are metal silicon microparticles constituting the metal silicon powder. This is a composition of a forming raw material in the case of employing a silicon-silicon carbide composite material as the material for the honeycomb structure section, and metal silicon is not added in the case of employing silicon carbide as the material for the honeycomb structure section.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 2.0 to 10.0 parts by mass with respect to 100 parts by mass of the total mass of the silicon carbide powder and the metal silicon powder.

The water content is preferably 20 to 60 parts by mass with respect to 100 parts by mass of the total mass of the silicon carbide powder and the metal silicon powder.

As the surfactant, ethylene glycol, dextrin, fatty acid soap, polyalcohol, or the like can be used. They may be used alone or in combination of two or more kinds. The surfactant content is preferably 0.1 to 2.0 parts by mass with respect to 100 parts by mass of the total mass of the silicon carbide powder and the metal silicon powder.

There is no particular limitation on the pore former as long as it forms pores after firing, and, for example, graphite, starch, a resin balloon, water-absorbent resin, and silica gel can be mentioned. The pore former content is preferably 0.5 to 10.0 parts by mass with respect to 100 parts by mass of the total mass of the silicon carbide powder and the metal silicon powder. The average particle diameter of the pore former is preferably 10 to 30 μm. When it is smaller than 10 μm, it may be impossible to form pores sufficiently. When it is larger than 30 μm, the die may be clogged upon forming. The average particle diameter of the pore former is a value measured by a laser diffraction method.

Next, the forming raw material is kneaded to form kneaded material. There is no particular limitation on the method for forming the kneaded material by kneading the forming raw material, and a method using, for example, a kneader or a vacuum kneader can be mentioned.

Next, a honeycomb formed body is formed by extruding the kneaded material. Upon extrusion, it is preferable to use a die having desired entire shape, cell shape, partition wall thickness, cell density, and the like. As the material for a die, a superhard alloy which hardly abrades away is preferable. The honeycomb formed body has a structure having partition walls separating and forming a plurality of cells functioning as fluid passages and the outer peripheral wall located in the outermost periphery.

The partition wall thickness, cell density, outer peripheral wall thickness, and the like of the honeycomb formed body can suitably be determined according to the structure of a honeycomb structure of the present invention to be manufactured in consideration of contraction upon drying and firing.

It is preferable to dry the honeycomb formed body obtained above. There is no particular limitation on the drying method, and there can be mentioned, for example, an electromagnetic wave heating method such as microwave heat-drying and high-frequency dielectric heat-drying and an external heating method such as hot air drying and superheated steam drying. Of these, it is preferable that, after a certain amount of water is dried by an electromagnetic wave heating method, the remaining water is dried by an external heating method in that the entire formed body can be dried quickly and uniformly with no crack generated. As the conditions for drying, it is preferable that, after 30 to 99 mass % of water with respect to the water amount before drying is removed by an electromagnetic heating method, water amount is reduced to 3 mass % or less by an external heating method. As the electromagnetic wave heating method, dielectric heat-drying is preferable. As the external heating method, hot air drying is preferable.

When the length of the honeycomb formed body in the central axial direction is not the desired length, it is preferable to cut both the end faces (end portions) to have a desired length. Though there is no particular limitation on the cutting method, a method using a rim saw cutter or the like can be mentioned.

Next, an electrode section-forming raw material for forming an electrode section is prepared. In the case that the main components of the electrode section is silicon carbide and silicon, the electrode section-forming raw material is preferably formed by adding predetermined additives to the silicon carbide powder and the silicon powder and kneading them.

Specifically, a metal silicon powder (metal silicon), a binder, a surfactant, a pore former, water, and the like are added to a silicon carbide powder (silicon carbide), and they are kneaded to prepare an electrode section-forming raw material. It is preferable that the mass of the metal silicon is 20 to 40 parts by mass with respect to 100 parts by mass of total mass of the silicon carbide powder and the metal silicon. The average particle diameter of the silicon carbide particles in the silicon carbide powder is preferably 10 to 60 µm. The average particle diameter of the metal silicon powder (metal silicon) is preferably 2 to 20 µm. When it is smaller than 2 µm, the electrical resistivity may become too small. When it is larger than 20 µm, the electrical resistivity may become too large. The average particle diameters of the silicon carbide particles and metal silicon (metal silicon particles) are values measured by a laser diffraction method. The silicon carbide particles are silicon carbide microparticles constituting the silicon carbide powder, and the metal silicon particles are metal silicon microparticles constituting the metal silicon powder.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 0.1 to 5.0 parts by mass with respect to 100 parts by mass of the total mass of the silicon carbide powder and the metal silicon powder.

The water content is preferably 15 to 60 parts by mass with respect to 100 parts by mass of the total mass of the silicon carbide powder and the metal silicon powder.

As the surfactant, ethylene glycol, dextrin, fatty acid soap, polyalcohol, or the like can be used. They may be used alone or in combination of two or more kinds. The surfactant content is preferably 0.1 to 2.0 parts by mass with respect to 100 parts by mass of the total mass of the silicon carbide powder and the metal silicon powder.

There is no particular limitation on the pore former as long as it forms pores after firing, and, for example, graphite, starch, a resin balloon, water-absorbent resin, and silica gel can be mentioned. The pore former content is preferably 0.1 to 5.0 parts by mass with respect to 100 parts by mass of the total mass of the silicon carbide powder and the metal silicon powder. The average particle diameter of the pore former is preferably 10 to 30 µm. When it is smaller than 10 µm, it may be impossible to form pores sufficiently. When it is larger than 30 µm, a large pore is easily formed, and strength may be reduced. The average particle diameter of the pore former is a value measured by a laser diffraction method.

Next, it is preferable that the mixture obtained by mixing the silicon carbide powder (silicon carbide), metal silicon (metal silicon powder), binder, surfactant, pore former, water, and the like is kneaded to obtain a pasty electrode section-forming raw material. There is no particular limitation on the kneading method, and, for example, a vertical stirrer can be used.

Next, the electrode section-forming raw material is preferably applied to the side face of the dried honeycomb formed body. Though there is no particular limitation on the method for applying the electrode section-forming raw material to the side face of the honeycomb formed body, for example, a printing method can be employed. It is preferable that the electrode section-forming raw material is applied to the side face of the honeycomb formed body to have a shape of the electrode section of the aforementioned honeycomb structure of the present invention. The thickness of the electrode section can be made as desired by adjusting the thickness when the electrode section-forming raw material is applied. Thus, since the electrode section can be formed only by applying the electrode section-forming raw material to the side face of the honeycomb formed body, drying, and firing, the electrode section can be formed very easily.

Next, it is preferable to dry the electrode section-forming raw material applied to the side face of the honeycomb formed body. A drying condition is preferably 50 to 100° C.

Next, it is preferable to manufacture an electrode terminal protruding portion-forming member. The electrode terminal protruding portion-forming member is bonded to the honeycomb formed body to function as the electrode terminal protruding portion. Though there is no particular limitation on the shape of the electrode terminal protruding portion-forming member, for example, a shape as shown in FIGS. 5 to 7 is preferable. It is preferable that the electrode terminal protruding portion-forming member obtained is bonded to the portion where the electrode protruding portion-forming raw material is applied of the honeycomb formed body having an electrode section-forming raw material applied thereto. The order of the manufacturing of the honeycomb formed body, preparation of the electrode protruding portion-forming raw material, and manufacturing of the electrode terminal protruding portion-forming member is regardless.

The electrode terminal protruding portion-forming member is preferably obtained by forming and drying an electrode terminal protruding portion-forming raw material (raw material for forming electrode terminal protruding portion-forming member). When the main components of the electrode terminal protruding portion are silicon carbide and silicon, the electrode terminal protruding portion-forming raw material is preferably formed by adding predetermined additives to the silicon carbide powder and the silicon powder and kneading them.

Specifically, the metal silicon powder (metal silicon), binder, surfactant, pore former, water, and the like are added to the silicon carbide powder (silicon carbide), and they are kneaded to prepare an electrode terminal protruding portion-forming raw material. The mass of the metal silicon is preferably 20 to 40 mass % with respect to the total of the mass of the silicon carbide powder and the mass of the metal silicon. The average particle diameter of the silicon carbide particles in the silicon carbide powder is preferably 10 to 60 µm. The average particle diameter of the metal silicon powder (metal silicon) is preferably 2 to 20 µm. When it is smaller than 2 µm, the electrical resistivity may become too small. When it is larger than 20 µm, the electrical resistivity may become too large. The average particle diameters of the silicon carbide particles and metal silicon particles (metal silicon) are values measured by a laser diffraction method. The silicon carbide particles are silicon carbide microparticles constituting the silicon carbide powder, and the metal silicon particles are metal silicon microparticles constituting the metal silicon powder.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 2.0 to 10.0 parts by mass with respect to 100 parts by mass of the total mass of the silicon carbide powder and the metal silicon powder.

The water content is preferably 20 to 40 parts by mass with respect to 100 parts by mass of the total mass of the silicon carbide powder and the metal silicon powder.

As the surfactant, ethylene glycol, dextrin, fatty acid soap, polyalcohol, or the like can be used. They may be used alone or in combination of two or more kinds. The surfactant content is preferably 0.1 to 2.0 parts by mass with respect to 100 parts by mass of the total mass of the silicon carbide powder and the metal silicon powder.

There is no particular limitation on the pore former as long as it forms pores after firing, and, for example, graphite, starch, a resin balloon, water-absorbent resin, and silica gel can be mentioned. The pore former content is preferably 0.1 to 5.0 parts by mass with respect to 100 parts by mass of the total mass of the silicon carbide powder and the metal silicon powder. The average particle diameter of the pore former is preferably 10 to 30 µm. When it is smaller than 10 µm, it may be impossible to form pores sufficiently. When it is larger than 30 µm, a large pore is easily formed, and strength may be reduced. The average particle diameter of the pore former is a value measured by a laser diffraction method.

Next, it is preferable to knead the mixture obtained by mixing the silicon carbide powder (silicon carbide), metal silicon (metal silicon powder), binder, surfactant, pore former, water, and the like to obtain an electrode terminal protruding portion-forming raw material. There is no particular limitation on the kneading method, and, for example, a kneader may be used.

There is no particular limitation on the method for forming the electrode terminal protruding portion-forming raw material obtained above into a shape of an electrode terminal protruding portion-forming member, and a method of machining after extrusion can be mentioned.

It is preferable that, after the electrode terminal protruding portion-forming raw material is formed into a shape of the electrode terminal protruding portion-forming member, it is dried to obtain the electrode terminal protruding portion-forming member. A drying condition is preferably 50 to 100° C.

Next, it is preferable to bond the electrode terminal protruding portion-forming member to the honeycomb formed body having the electrode section-forming raw material applied thereto. Though there is no particular limitation on the method of bonding the electrode terminal protruding portion-forming member to the honeycomb formed body (portion having the electrode section-forming raw material applied thereto of the honeycomb formed body), it is preferable to bond the electrode terminal protruding portion-forming member to the honeycomb formed body by the use of the aforementioned electrode section-forming raw material. For example, it is preferable to apply the electrode section-forming raw material to the "surface to be bonded to the honeycomb formed body (surface brought into contact with the honeycomb formed body)" of the electrode terminal protruding portion-forming member to bond the electrode terminal protruding portion-forming member to the honeycomb formed body in such a manner that the "surface where the electrode section-forming raw material is applied" is brought into contact with the honeycomb formed body.

Then, it is preferable that the "honeycomb formed body where the electrode section-forming raw material is applied and where the electrode terminal protruding portion-forming member is bonded" is dried and fired to obtain a honeycomb structure of the present invention.

A drying condition at this time is preferably 50 to 100° C.

It is preferable to perform calcination before firing in order to remove the binder and the like. The calcination is preferably performed at 400 to 500° C. for 0.5 to 20 hours in the ambient atmosphere. There is no particular limitation on the method of calcination and firing, and firing can be performed by the use of an electric furnace, a gas furnace, or the like. As the firing conditions, it is preferably heated at 1400 to 1500° C. for 1 to 20 hours in an inert atmosphere of nitrogen, argon, or the like. After firing, it is preferable to perform an oxygenation treatment at 1200 to 1350° C. for 1 to 10 hours in order to improve durability.

Incidentally, the electrode terminal protruding portion-forming member may be bonded before the honeycomb formed body is fired or after it is fired. In the case of bonding the electrode terminal protruding portion-forming member after the honeycomb formed body is fired, it is preferable to fire it again under the aforementioned conditions after the bonding.

EXAMPLE

Hereinbelow, the present invention will more specifically be described with Examples. However, the present invention is by no means limited to these Examples.

Example 1

A silicon carbide (SiC) powder and a metal silicon (Si) powder were mixed together at a mass ratio of 80:20; and hydroxypropylmethyl cellulose as the binder and a water-absorbent resin as the pore former were added to them, and water was added to obtain a forming raw material; and the forming raw material was kneaded by a vacuum kneader to produce a circular columnar kneaded material. The binder content was 7 parts by mass with respect to 100 parts by mass of the total of the silicon carbide (SiC) powder and the metal silicon (Si) powder, the pore former content was 3 parts by mass with respect to 100 parts by mass of the total of the silicon carbide (SiC) powder and the metal silicon (Si) powder, and the water content was 42 parts by mass with respect to 100 parts by mass of the total of the silicon carbide (SiC) powder and the metal silicon (Si) powder. The average particle diameter of the silicon carbide powder was 20 and the average particle diameter of the metal silicon powder was 6 µm. The average particle diameter of the pore former was 20 µm. The average particle diameters of the silicon carbide, metal silicon, and pore former were values measured by a laser diffraction method.

The circular columnar kneaded material obtained was formed by the use of an extruder to obtain a honeycomb formed body. After the honeycomb formed body obtained was subjected to high-frequency dielectric heat-drying, it was dried at 120° C. for 2 hours by the use of hot air drier, and a predetermined amount of both the end faces was cut off.

Next, the silicon carbide (SiC) powder and the metal silicon (Si) powder were mixed together at a mass ratio of 60:40; hydroxypropylmethyl cellulose as the binder, glycerin as the moisturizer, and a surfactant as the dispersant were added to them; water was added to them; and they were mixed. The mixture was kneaded to produce an electrode section-forming raw material. The binder content was 0.5 part by mass with respect to 100 parts by mass of the total of the silicon carbide (SiC) powder and the metal silicon (Si) powder, the glycerin content was 10 parts by mass with respect to 100 parts by mass of the total of the silicon carbide (SiC) powder and the metal silicon (Si) powder, the surfactant content was 0.3 part by mass with respect to 100 parts by mass of the total of the silicon carbide (SiC) powder and the metal silicon (Si) powder, and the water content was 42 parts by mass with respect to 100 parts by mass of the total of the silicon carbide (SiC) powder and the metal silicon (Si) powder. The average particle diameter of the silicon carbide powder was 52 and the average particle diameter of the metal silicon powder was 6 μm. The average particle diameters of the silicon carbide and metal silicon were values measured by a laser diffraction method. The kneading was performed by a vertical stirrer.

Next, the electrode section-forming raw material was applied to the side face of the dried honeycomb formed body into a band-like shape extending over between both the end faces of the honeycomb formed body in such a manner that the thickness was 1.5 mm and that "0.5 times the central angle in a cross section perpendicular to the cell extension direction was 15°". The electrode section-forming raw material was applied to two positions on the side face of the dried honeycomb formed body. In a cross section perpendicular to the cell extension direction, one of the two portions having the electrode section-forming raw material applied thereto was disposed on the opposite side from the other portion across the center of the honeycomb formed body.

Next, the electrode section-forming raw material applied to the honeycomb formed body was dried. A drying condition was 70° C.

Next, the silicon carbide (SiC) powder and the metal silicon (Si) powder were mixed together at a mass ratio of 60:40, hydroxypropylmethyl cellulose as the binder was added to them, water was added to them, and they were mixed. The mixture was kneaded to produce an electrode section-forming raw material. A kneaded material was obtained by the electrode terminal protruding portion-forming raw material using a vacuum kneader. The binder content was 4 parts by mass with respect to 100 parts by mass of the total of the silicon carbide (SiC) powder and the metal silicon (Si) powder, and the water content was 22 parts by mass with respect to 100 parts by mass of the total of the silicon carbide (SiC) powder and the metal silicon (Si) powder. The average particle diameter of the silicon carbide powder was 52 μm, and the average particle diameter of the metal silicon powder was 6 μm. The average particle diameters of the silicon carbide and metal silicon were values measured by a laser diffraction method.

The kneaded material obtained above was formed by the use of a vacuum kneader, processed to have a shape (shape consisting of a substrate and a protruding portion) as the electrode terminal protruding portion 22 shown in FIGS. 5 to 7, and dried to obtain an electrode terminal protruding portion-forming member. A drying condition was 70° C. The portion corresponding to the plate-like substrate 22a had a size of "3 mm×12 mm×15 mm". In addition, the portion corresponding to the protruding portion 22b had a circular columnar shape having a bottom face diameter of 7 mm and a length of 10 mm in the central axial direction. Two electrode terminal protruding portion-forming members were manufactured.

Next, each of the two electrode terminal protruding portion-forming members was bonded to each of two portions having the electrode section-forming raw material applied thereto of the honeycomb formed body. The electrode terminal protruding portion-forming member was bonded to the portion having the electrode section-forming raw material applied thereto of the honeycomb formed body by the use of the electrode section-forming raw material. Then, the "honeycomb formed body having the electrode section-forming raw material applied thereto and the electrode terminal protruding portion-forming member bonded thereto" was degreased, fired, and subjected to an oxidation treatment to obtain a honeycomb structure. Conditions of degreasing were 550° C. for 3 hours. Conditions of firing were 1450° C. for two hours in an argon atmosphere. Conditions of the oxidation treatment were 1300° C. for one hour.

The average pore size (pore diameter) of the partition walls of the honeycomb structure obtained above was 8.6 μm, and the porosity was 45%. The average pore size and the porosity were values measured by a mercury porosimeter. The partition wall thickness of the honeycomb structure was 90 μm, and the cell density was 90 cells/cm$^2$. In addition, the bottom face of the honeycomb structure had a circular shape having a diameter of 93 mm, and the length of the honeycomb structure in the cell extension direction was 100 mm. The isostatic strength of the honeycomb structure obtained was 2.5 MPa. The isostatic strength is fracture strength measured by applying hydrostatic pressure in water. In a cross section perpendicular to the cell extension direction, 0.5 times the central angle of each of the two electrode sections of the honeycomb structure was 15°. The thickness of each of the two electrode sections was 1.5 mm. The electrical resistivity of the electrode sections was 1.3 Ωcm, the electrical resistivity of the honeycomb structure section was 100 Ωcm, and the electric resistivity of the electrode terminal protruding portion was 1.3 Ωcm.

There was measured the temperature (maximum temperature) at the position P (see FIG. 6) where an end portion of the electrode section is brought into contact with the honeycomb structure section in a cross section perpendicular to the cell extension direction at the time of applying a voltage of 200 V to the honeycomb structure obtained above. The position where an end portion of the electrode section is brought into contact with the honeycomb structure section is the position where a current flows most and where the temperature becomes highest in the honeycomb structure. The results are shown in Table 1.

Incidentally, the electric resistivity of the electrode section and the electrode terminal protruding portion was measured according to the following method. The test piece of 10 mm×10 mm×50 mm was manufactured with a material which was the same as that for the object to be measured (That is, each of the test pieces was manufactured with the same material as that for the honeycomb structure section in the case of measuring an electrical resistivity of the honeycomb structure section, the same material as that for the electrode section in the case of measuring an electrical resistivity of the electrode section, or the same material as that for the electrode terminal protruding portion in the case of measuring an electric resistivity of the electrode terminal protruding portion.). Wiring was performed by applying a silver paste on both the entire end portions of the test piece so as to be able to electrify the test piece. A voltage-applying current measurement device was connected to the test piece, and application was performed. A thermocouple was disposed in the center portion of the test piece, and the change of the temperature of the test piece upon applying a voltage with the passage of time was confirmed by a recorder. With applying 100 to 200 V, a current value and a voltage value were measured at a state where the temperature of the test piece was 400° C., and the electrical resistivity was calculated from the current value and the voltage value obtained above and the size of the test piece.

TABLE 1

|  | 0.5 times central angle (°) | Thickness of electrode section (mm) | Maximum temperature (° C.) |
| --- | --- | --- | --- |
| Example 1 | 15 | 1.5 | 120 |
| Example 2 | 20 | 1.5 | 102 |
| Example 3 | 25 | 1.5 | 82 |
| Example 4 | 30 | 1.5 | 83 |
| Example 5 | 35 | 1.5 | 58 |
| Example 6 | 40 | 1.5 | 100 |
| Example 7 | 45 | 1.5 | 138 |
| Example 8 | 50 | 1.5 | 143 |
| Example 9 | 55 | 1.5 | 152 |
| Example 10 | 60 | 1.5 | 171 |
| Example 11 | 65 | 1.5 | 186 |
| Example 12 | 40 | 0.01 | 105 |
| Example 13 | 40 | 5 | 110 |
| Comp. Ex. 1 | 10 | 1.5 | 220 |
| Comp. Ex. 2 | 70 | 1.5 | 238 |

Examples 2 to 13, Comparative Examples 1, 2

Each of the honeycomb structures was manufactured in the same manner as in Example 1 except that "0.5 times the central angle in a cross section perpendicular to the cell extension direction of each of the two electrode sections" and "thickness of the two electrode sections" were changed as shown in Table 1. The "maximum temperature" of the honeycomb structure was measured in the same manner as in Example 1. The results are shown in Table 1.

From Table 1, it is understood that the maximum temperature of the honeycomb structure is low when the "value of 0.5 times the central angle in a cross section perpendicular to the cell extension direction of each of the two electrode sections of the honeycomb structure" is 15 to 65°. The low maximum temperature of the honeycomb structure means that bias of the temperature distribution in the honeycomb structure is suppressed. Incidentally, the aforementioned maximum temperature of 200° C. or less of the honeycomb structure indicates that bias of the temperature distribution in the honeycomb structure is suppressed.

INDUSTRIAL APPLICABILITY

A honeycomb structure of the present invention can suitably be used as a catalyst carrier for an exhaust gas purification apparatus for purifying exhaust gas from automobiles.

DESCRIPTION OF REFERENCE NUMERALS

1: partition wall, 2: cell, 3: outer peripheral wall, 4: honeycomb structure section, 5: side face, 11: one end face, 12: the other end face, 21: electrode section, 21a: one end portion (of electrode section), 21b: the other end portion (of electrode section), 22: electrode terminal protruding portion, 22a: substrate, 22b: protruding portion, 23: end portion in peripheral direction (of electrode section), 100, 200, 300, 400, 500: honeycomb structure, O: center, α: central angle, β: angle, θ: angle of 0.5 times the central angle, A, B, C: region in electrode section, E, G: length of corner portion in cell direction, F, H: length of corner portion in perpendicular direction, I: cell extension direction, P: position where end portion of electrode section is brought into contact.

The invention claimed is:

1. A honeycomb structure comprising:
a cylindrical honeycomb structure section having porous partition walls separating and forming a plurality of cells extending from one end face to the other end face and functioning as fluid passages and an outer peripheral wall located in the outermost periphery and a pair of electrode sections disposed on the side face of the honeycomb structure section,
wherein the honeycomb structure section has an electrical resistivity of 1 to 200 Ωcm,
each of the pair of electrode sections is formed into a band-like shape extending in a cell extension direction of the honeycomb structure section,
in a cross section perpendicular to the cell extension direction, one electrode section of the pair of electrode sections is disposed across the center of the honeycomb structure section from the other electrode section of the pair of electrode sections, and
in a cross section perpendicular to the cell extension direction, 0.5 times the central angle of each of the electrode sections is 15 to 65° and
the cells are arranged adjacent to one another in an uninterrupted manner from the one electrode section to the other electrode section.

2. The honeycomb structure according to claim 1, wherein the electrical resistivity of the electrode section is 0.1 to 100 Ωcm.

3. The honeycomb structure according to claim 1, wherein the thickness of the electrode section is 0.01 to 5 mm.

4. The honeycomb structure according to claim 1, wherein an electrode terminal protruding portion for connecting an electrical wiring is disposed in a center portion in a cross section perpendicular to the cell extension direction and center portion in the cell extension direction of each of the electrode sections.

5. The honeycomb structure according to claim 1, wherein the electrode section has a plurality of regions arranged along the outer periphery of the honeycomb structure section in a cross section perpendicular to the cell extension direction, and
wherein the electrode section is thickest in a region located at the center, thinner in a region closer to the outside, and thinnest in a region located at both ends in a cross section perpendicular to the cell extension direction.

6. The honeycomb structure according to claim 2, wherein the thickness of the electrode section is 0.01 to 5 mm.

7. The honeycomb structure according to claim 2, wherein an electrode terminal protruding portion for connecting an electrical wiring is disposed in a center portion in a cross section perpendicular to the cell extension direction and center portion in the cell extension direction of each of the electrode sections.

8. The honeycomb structure according to claim 3, wherein an electrode terminal protruding portion for connecting an electrical wiring is disposed in a center portion in a cross section perpendicular to the cell extension direction and center portion in the cell extension direction of each of the electrode sections.

9. The honeycomb structure according to claim 6, wherein an electrode terminal protruding portion for connecting an electrical wiring is disposed in a center portion in a cross section perpendicular to the cell extension direction and center portion in the cell extension direction of each of the electrode sections.

10. The honeycomb structure according to claim 2, wherein the electrode section has a plurality of regions arranged along the outer periphery of the honeycomb structure section in a cross section perpendicular to the cell extension direction, and wherein the electrode section is thickest in a region located at the center, thinner in a region closer to the outside, and thinnest in a region located at both ends in a cross section perpendicular to the cell extension direction.

11. The honeycomb structure according to claim 3, wherein the electrode section has a plurality of regions arranged along the outer periphery of the honeycomb structure section in a cross section perpendicular to the cell extension direction, and wherein the electrode section is thickest in a region located at the center, thinner in a region closer to the outside, and thinnest in a region located at both ends in a cross section perpendicular to the cell extension direction.

12. The honeycomb structure according to claim 6, wherein the electrode section has a plurality of regions arranged along the outer periphery of the honeycomb structure section in a cross section perpendicular to the cell extension direction, and wherein the electrode section is thickest in a region located at the center, thinner in a region closer to the outside, and thinnest in a region located at both ends in a cross section perpendicular to the cell extension direction.

13. The honeycomb structure according to claim 4, wherein the electrode section has a plurality of regions arranged along the outer periphery of the honeycomb structure section in a cross section perpendicular to the cell extension direction, and wherein the electrode section is thickest in a region located at the center, thinner in a region closer to the outside, and thinnest in a region located at both ends in a cross section perpendicular to the cell extension direction.

14. The honeycomb structure according to claim 7, wherein the electrode section has a plurality of regions arranged along the outer periphery of the honeycomb structure section in a cross section perpendicular to the cell extension direction, and wherein the electrode section is thickest in a region located at the center, thinner in a region closer to the outside, and thinnest in a region located at both ends in a cross section perpendicular to the cell extension direction.

15. The honeycomb structure according to claim 8, wherein the electrode section has a plurality of regions arranged along the outer periphery of the honeycomb structure section in a cross section perpendicular to the cell extension direction, and wherein the electrode section is thickest in a region located at the center, thinner in a region closer to the outside, and thinnest in a region located at both ends in a cross section perpendicular to the cell extension direction.

16. The honeycomb structure according to claim 9, wherein the electrode section has a plurality of regions arranged along the outer periphery of the honeycomb structure section in a cross section perpendicular to the cell extension direction, and wherein the electrode section is thickest in a region located at the center, thinner in a region closer to the outside, and thinnest in a region located at both ends in a cross section perpendicular to the cell extension direction.

* * * * *